United States Patent
Heddes et al.

(10) Patent No.: US 6,588,008 B1
(45) Date of Patent: Jul. 1, 2003

(54) ASSEMBLER TOOL FOR PROCESSOR-COPROCESSOR COMPUTER SYSTEMS

(75) Inventors: Marco C. Heddes, Raleigh, NC (US); Ross Boyd Leavens, Cary, NC (US); Mark Anthony Rinaldi, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/546,755

(22) Filed: Apr. 11, 2000

(51) Int. Cl.$^7$ .................................................. G06F 9/45
(52) U.S. Cl. ........................ 717/149; 712/32; 712/37; 712/1; 712/200
(58) Field of Search .............................. 712/1, 10, 28, 712/32, 37, 200, 220; 717/136, 147, 149

(56) References Cited

U.S. PATENT DOCUMENTS

| | | | | |
|---|---|---|---|---|
| 5,459,854 A | * | 10/1995 | Sherer et al. ................... | 713/1 |
| 5,488,714 A | * | 1/1996 | Skidmore ..................... | 706/45 |
| 5,548,769 A | | 8/1996 | Baum et al. ................. | 395/800 |
| 5,604,905 A | * | 2/1997 | Tevanian et al. ............ | 717/140 |
| 5,619,713 A | | 4/1997 | Baum et al. ................. | 395/800 |
| 5,724,600 A | * | 3/1998 | Ogi ............................. | 709/104 |
| 6,002,881 A | * | 12/1999 | York et al. ................... | 711/147 |
| 6,247,113 B1 | * | 6/2001 | Jagger ........................ | 712/200 |
| 6,473,897 B1 | * | 10/2002 | Ansari et al. ................ | 717/136 |

FOREIGN PATENT DOCUMENTS

WO  WO 97/22925  12/1996

OTHER PUBLICATIONS

"Motorola MC68030 Enhanced 32–bit Microprocessor User's Manual: 3rd Edition," 1992 (pp. 24–26, 35, and 361–435).*

"IBM System/370 Emulator Micro–Instruction Portion Implemented in Master–Slice (Gate Array) Logic", IBM Technical Disclosure Bulletin, vol. 30, No. 4, Sep., 1987.

"Object–Oriented Assembler/Disassembler", IBM Technical Disclosure Bulletin, vol. 38, No. 7, Jul. 1995.

* cited by examiner

*Primary Examiner*—Gregory Morse
*Assistant Examiner*—Kenneth A Gross
(74) *Attorney, Agent, or Firm*—Driggs, Lucas, Brubaker & Hogg; Patrick J. Daugherty

(57) ABSTRACT

A central processor-coprocessor assembly comprising an assembler software tool for extending the base central processor tasks into at least one coprocessor. What is important is that the assembler software tool does not need to be rebuilt when changes are made to the coprocessor elements. The invention allows assembly time extension of a base core language processing (CLP) programming model, without the need to rebuild the assembler tool itself. The assembler tool comprises a set of commands which enable the central processor to manipulate the coprocessor registers, and a coprocessor execute instruction, which initiates command processing on the coprocessor. The present invention simplifies the maintenance of the assembler tool through multiple hardware revisions by enabling hardware designers to update their coprocessor definition files to reflect new or modified coprocessors.

14 Claims, 10 Drawing Sheets

FIG. 3
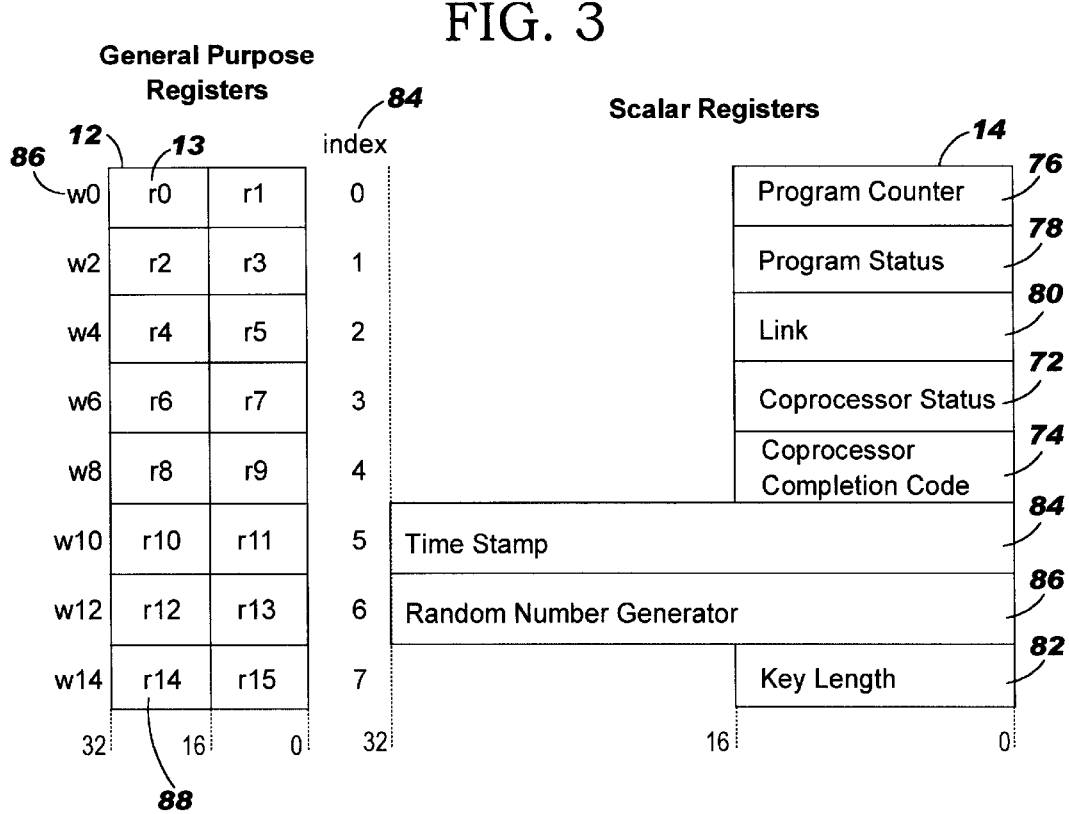
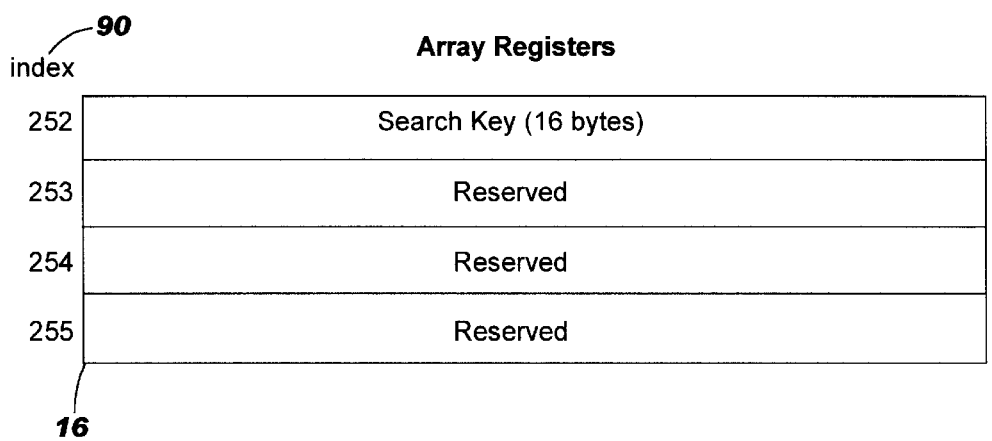

FIG. 7

Table 1

```
; simple assembler test case
        ldr     r0, #7      ; load constant 7 into register r0
        add     r0, #2      ; add 2 to r0 and store result in r0
        end
```

---

Table 2

```
; assembler test case attempting to use data store
        ldr     r0, #7      ; load constant 7 into register r0
        add     r0, #2      ; add 2 to r0 and store result in r0

; the following instructions use the ds co-processor
        ldr     r0, DSA          ; load r0 from ds scalar register DSA   — 154
        ldr     r1, fishpool[ 0 ] ; load r1 from ds fishpool array
        wrdnds  #0               ; execute ds command write down data store
        end
```
150 — wrdnds
152 — fishpool[ 0 ]

---

Table 3

```
100 ─┐
 ds      COPROCESSOR    1        — 102
         COMMANDS                — 104
158        wrdnds       = 0      — 106
150

ARRAYS                  — 108
           fishpool     = 254    — 110
152

SCALARS                 — 112
154        DSA          = 0      — 114
         ENDS                    — 116
```

```
; assembler test case attempting to use data store
        ldr     r0, #7      ; load constant 7 into register r0
        add     r0, #2      ; add 2 to r0 and store result in r0
; the following instructions use the ds co-processor
130 ─── ldr   r0, DSA           — 154 ; load r0 from ds scalar register DSA
132 ─── ldr   r1, fishpool[ 0 ] ; load r1 from ds fishpool array in Direct Mode
118 ─── wrdnds  #0              ; execute ds command write down data store
              150    152          in Direct Mode
        end
```

FIG. 10

| Instruction | | | | | | | | | | |
|---|---|---|---|---|---|---|---|---|---|---|
| Invalid Operation | 0 0 0 0 0 0 | colspan="8" | don't care | | | | | | | |
| Nop | 0 0 0 0 0 1 | colspan="8" | 0 0 0 0 0 0 0 0 0 0 0 0 0 0 0 0 0 0 0 0 0 0 0 0 0 0 | | | | | | | 1 |
| Exit | 0 0 0 0 1 0 | colspan="8" | 0 0 0 0 0 0 0 0 0 0 0 0 0 0 0 0 0 0 0 0 0 0 0 0 0 0 | | | | | | | |
| Arithmetic Immediate | 0 0 0 1 0 | i | OT | Cond | Rd | imm4 | AluOp | imm8 | | | 2 |
| Arithmetic/Logical Register | 0 0 0 1 1 | i | OT | Cond | Rd | Rs | AluOp | 0 0 0 0 0 0 0 0 | | | |
| Load Immediate | 0 0 1 1 1 0 | | OT | Cond | Rd | imm16 | | | | | 9 |
| Compare Immediate  4a | 0 0 1 1 1 1 | | OT | Cond | Rd | imm16 | | | | | |
| Load / Store  4b | 0 0 1 0 0 | x | OT | Cond | R | D | Ra | C# | CR | off6 | |
| Load / Store  4c | 0 0 1 0 1 | x | OT | Cond | R | D 0 off2 | | C# | CR | off6 | 3 |
| Load / Store | 0 0 1 0 1 | x | OT | Cond | R | D 1 0 0 | | C# | CR | | |
| Branch and Link | 0 0 1 1 0 0 | | 1 1 | Cond | Rt | target16 | | | | | |
| Return from subroutine | 0 0 1 1 0 1 | | 0 0 | Cond | 0 0 0 0 0 0 0 0 0 0 0 0 0 0 0 0 0 0 0 0 | | | | | | |
| Branch on Condition (register) | 0 0 1 1 0 1 | | 0 1 | Cond | 0 0 0 0 | Rt | 0 0 0 0 0 0 0 0 0 0 0 0 | | | | 4 |
| Branch on Condition (PC relative) | 0 0 1 1 0 1 | | 1 0 | Cond | 0 0 0 0 | disp16 | | | | | |
| Branch on Condition (direct) | 0 0 1 1 0 1 | | 1 1 | Cond | Rt | target16 | | | | | |
| Load Key | 0 1 0 0 0 | c | bitoff5 | | len5 | Rs | 0 0 0 0 0 0 0 0 0 0 0 | | | | |
| Load Key | 0 1 0 0 1 | c | 0 x bitoff3 | | len5 | 0 0 off2 | | C#s | CRs | off6 | 5 |
| Load Key | 0 1 0 0 1 | c | 0 x bitoff3 | | len5 | 1 | Ra | C#s | CRs | off6 | |
| Load Key Immediate | 0 1 0 0 1 | c | 1 0 0 0 0 0 | | len4 | imm16 | | | | | |
| Logical Immediate | 0 1 1 1 0 | i | Op | Cond | R | imm16 | | | | | 10 |
| Compare Memory Multiple | 0 1 1 0 0 1 | colspan="8" | ? | | | | | | | | 6 |
| Compare Registry Multiple | 0 1 1 0 1 1 | colspan="8" | ? | | | | | | | | |
| Move | 1 0 0 | W | C#2 | CR1 | | D | Ra | C#2 | CR2 | off6 | |
| Move | 1 0 1 | W | C#2 | CR1 | | D 0 off2 | | C#2 | CR2 | off6 | |
| Move | 1 0 1 1 | | C#d | CRd | | 0 1 0 0 | | C#s | CRs | | 7 |
| Move Multiple | 1 1 0 0 | | C#d | CRd 0 0 | off4d | 0 0 0 0 | | C#s | CRs 0 0 | off4s | |
| Move Immediate  5b | 1 1 0 1 | | C#1 | CR1 | | imm16 | | | | | |
| Coprocessor Wait | 1 1 1 0 | 0 0 0 0 | 0 0 0 0 0 0 0 0 | | | mask16 | | | | | |
| Coprocessor Wait and Branch | 1 1 1 0 | | C# | 0 0 0 0 0 0 b k 1 | | target16 | | | | | 8 |
| Coprocessor Execute (direct) | 1 1 1 1 | | C# | CPop | | a 0 | | imm16 | | | |
| Coprocessor Execute (indirect) | 1 1 1 1 | | C# | CPop | | a 1 | R | imm12 | | | |

5a

ASSEMBLER TOOL FOR PROCESSOR-COPROCESSOR COMPUTER SYSTEMS

FIELD OF THE INVENTION

The invention relates to the field of a microprocessor—coprocessor architecture. More particularly, it relates to the development of a software assembler tool for use with network processors in interfacing central processors with coprocessors.

BACKGROUND OF THE INVENTION

The use of coprocessors with central processors in the design of a computer system processing complex architecture is well known. By assigning a task to a specific coprocessor, rather than requiring the central processor to perform the task, a processing complex designer may increase the efficiency and performance of a computer system. In order to add a coprocessor to a processor complex under prior art, a complex designer must program an assembler software tool that provides the hardware instructions required by the central processor to operate the coprocessor. However, a significant drawback to the efficient use of coprocessors is the need to rebuild the assembler software tool every time a coprocessor is changed or added. Accordingly, the finished design may not be changed to incorporate different or additional coprocessors without rebuilding the assembler software tool, where rebuilding involves reprogramming the assembler tool software.

SUMMARY OF THE INVENTION

The drawbacks of the prior art are solved by the development of a new assembler tool and associated processor—coprocessor architecture. This invention provides for a core language processor-coprocessor assembly comprising an assembler software tool for extending the base core language processor (CLP) tasks into at least one coprocessor. What is important is that the assembler software tool does not need to be rebuilt when changes are made to the coprocessor elements. The invention allows assembly time extension of a base core language processing (CLP) programming model, without the need to rebuild the assembler tool itself.

The addition of a coprocessor to a microprocessor or other central processor exposes the central processor programming model to a set of scalar registers, array registers and commands. The present invention provides for an assembler tool comprising a set of instructions within the microprocessor complex which manipulate the coprocessor registers, and a coprocessor execute command which initiates command processing on the coprocessor. The software component of the present invention is a special hardware command that executes among the coprocessors. The core language processor fetch's that command from its processor memory, decodes the fact that it is intended to be executed on the coprocessor, and gives it to one of the coprocessors. The hardware component of the present invention is a unique CLP-coprocessor architecture that incorporates and enables the software embodiment. The present invention simplifies the maintenance of the assembler tool through multiple hardware revisions by enabling programmer's to update their coprocessor definition files to reflect new or modified coprocessors. The assembler tool itself does not have to be rebuilt to track hardware changes associated with the addition of new coprocessors or modifications of existing ones.

The use of include files is standard prior art. What is new is the inclusion of a special assembler directive in the include files which describes a given coprocessor, the instructions available on the coprocessor, and the hardware registers that the coprocessor supports. The include file assembler directive describes to a core assembler the details of a specific coprocessor in such a way that the core assembler does not have to be rebuilt when the coprocessor is changed. The invention instructs the assembler program itself to recognize the new device. A programmer utilizing the invention supplies text input which specifies specific commands to be executed. The core assembler recognizes those commands and accordingly the correct syntax for those commands and generates the machine code for those commands.

The invention stabilizes the basic core language coprocessor instruction set and documentation associated with it. A further advantage is that the invention allows a hardware designer to test different "what if" scenarios when considering the addition of a new coprocessors or modifications of existing ones, through the use of software simulators.

BRIEF DESCRIPTION OF THE DRAWINGS

FIG. 3 is a diagrammatic representation of the central processor complex registers of the present invention.

FIG. 7 is a tabular representation of assembly code commands and programming of the present invention.

FIG. 10 is a tabular representation of the core execute instruction set of the central processor of the present invention.

DETAILED DESCRIPTION OF THE INVENTION

Figure 1:
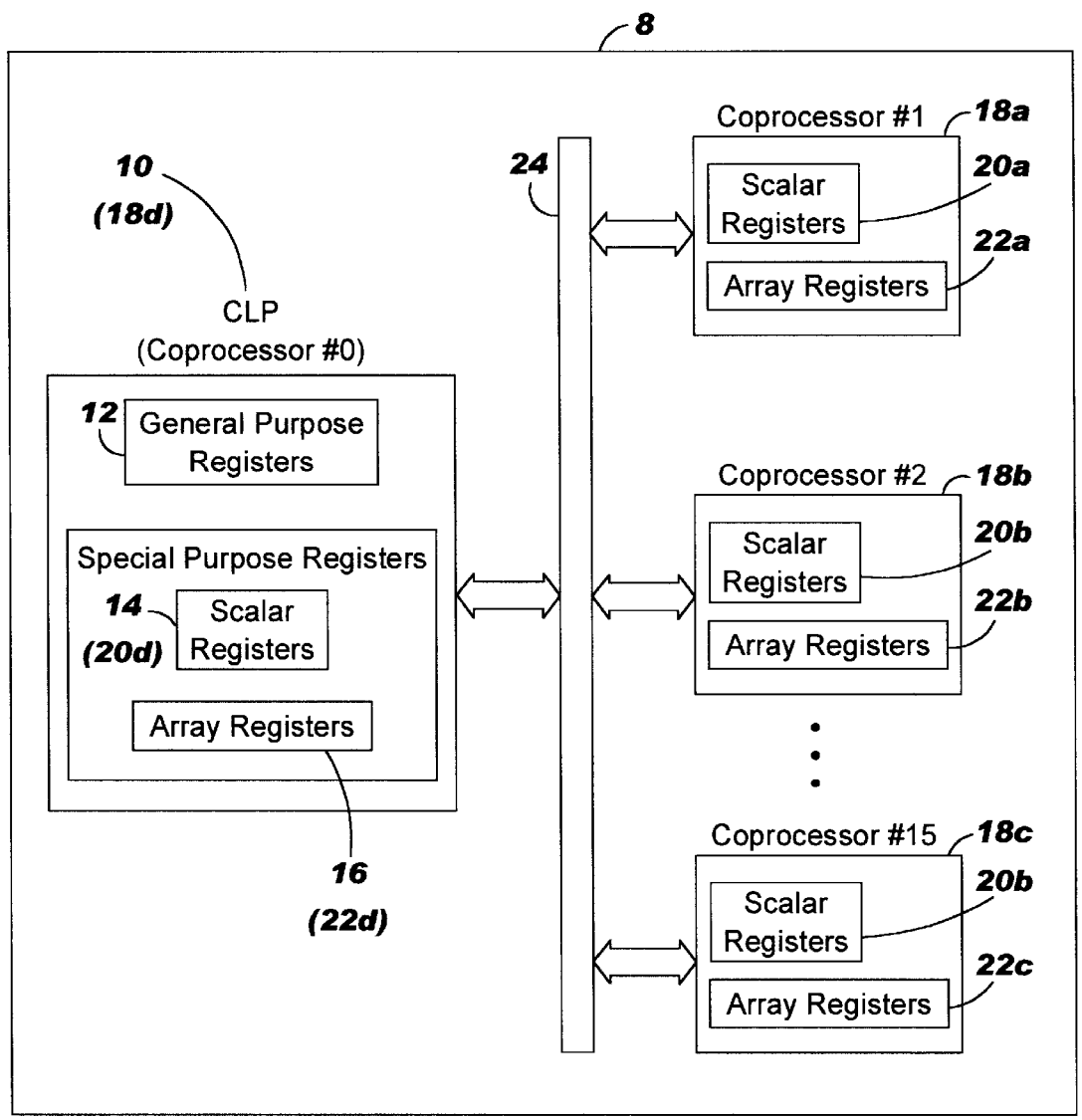
FIG. 1 is a diagrammatic representation of a core language processor complex incorporating the present invention.

This invention provides for a central processor-coprocessor assembly comprising an assembler software tool for extending the base central processor tasks into at least one coprocessor. FIG. 1 is a diagrammatic representation of a core language processor complex 8 incorporating the present invention, comprising a core language processor (CLP) 10. This embodiment is an embedded network processor complex that provides and controls the programmability of a network processor. A network processing complex incorporating this invention is also described in related patent application Ser. No. 09/548,109, filed Apr. 12, 2000, entitled "Coprocessor Structure and Method for a Communications System Network Processor." The details of CLP processors do not comprise a part of the present invention except to the extent that they are part of the overall architecture of the network processor system and intergage with the assembler tool and specific CLP and coprocessor components of the present invention. The specific details including the architecture and the programing of the individual coprocessors useful in the present invention are not deemed to comprise a part of the present invention. It is readily apparent to one skilled in the art that the present invention may also be used in a microprocessor-coprocessor personal computer complex, such as an EBM-compatible personal computer using a PENTIUM® family microprocessor manufactured by the Intel manufactured by the Intel Corporation, Inc.

A portion of the disclosure of this patent document contains material to which a claim for copyright is made. The copyright owner has no objection to the facsimile reproduction by anyone of the patent document or patent disclosure, as it appears in the Patent and Trademark Office patent file or records, but reserves all other copyright rights whatsoever.

Referring again to FIG. 1, a core language processor (CLP) 10 includes CLP general purpose registers 12, CLP scalar register 14 and CLP general purpose array register 16. The CLP 10 is connected via a coprocessor interface 24 to a plurality of coprocessors 18: 18a, 18b, 18c and 18d. In the present embodiment up to 16 coprocessors may be supported, but it is readily apparent to one skilled in the art that more than 16 coprocessors may be supported. The coprocessors 18 each further comprise coprocessor scalar registers 20 (20a through 20d) and coprocessor array registers 22 (22a through 22d). Accordingly, the addition of coprocessors 18 to the CLP 10 exposes the CLP 10 to a set of scalar registers 20 and array registers 22. The CLP 10 may address itself as coprocessor 18d in assigning coprocessor commands and accessing coprocessor registers, and therefore the CLP 10 is also assigned the identifier "Coprocessor #0" in FIG. 1. Accordingly, CLP 10 is also labeled coprocessor 18d, CLP scalar register 14 is also labeled coprocessor scalar register 20d, and CLP general purpose array register 16 is also labeled coprocessor scalar registers 20d.

Figure 2:
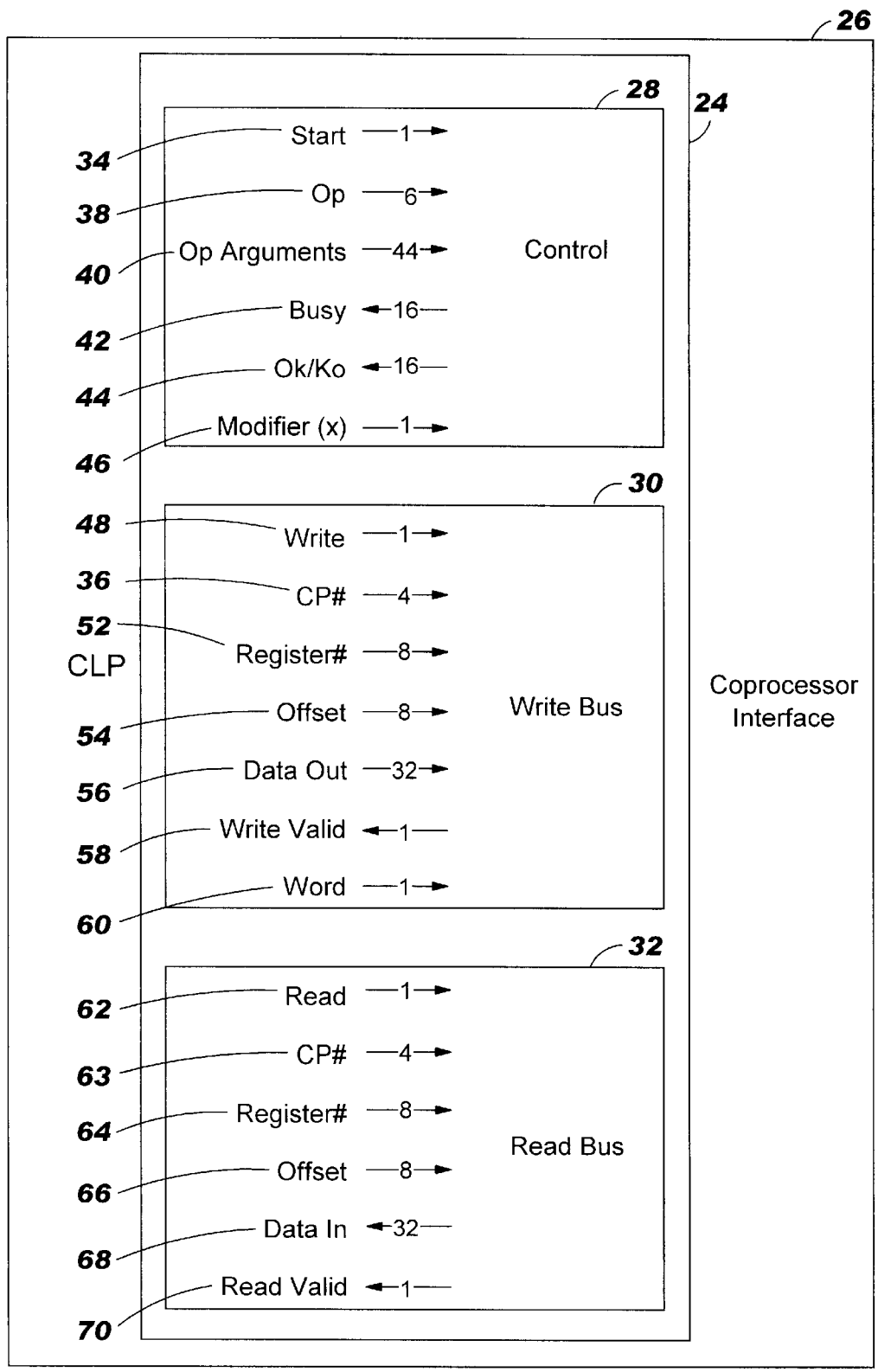
FIG. 2 is a diagrammatic representation of the main embedded core of the central processor of the present invention.

Referring now to FIG. 2, the main embedded core 26 of the CLP 10 of FIG. 1 is depicted, illustrating the individual hardware assignments of the coprocessor interface 24. The coprocessor interface 24 comprises a coprocessor control interface 28, a coprocessor write interface 30 and a coprocessor read interface 32. The numbering label appearing next to teach of the individual assignments indicates the number of individual wire connections. The control interface 28 enables the CLP 10 to control any of the coprocessors 18. For the purposes of this embodiment illustration, coprocessor 18a will be referred to henceforth as the coprocessor 18 controlled by the CLP 10, although any of the coprocessors 18 may be chosen. The selection of coprocessor 18a is a result of a "coprocessor directive," which will be discussed in greater detail later in this disclosure.

Figure 4:
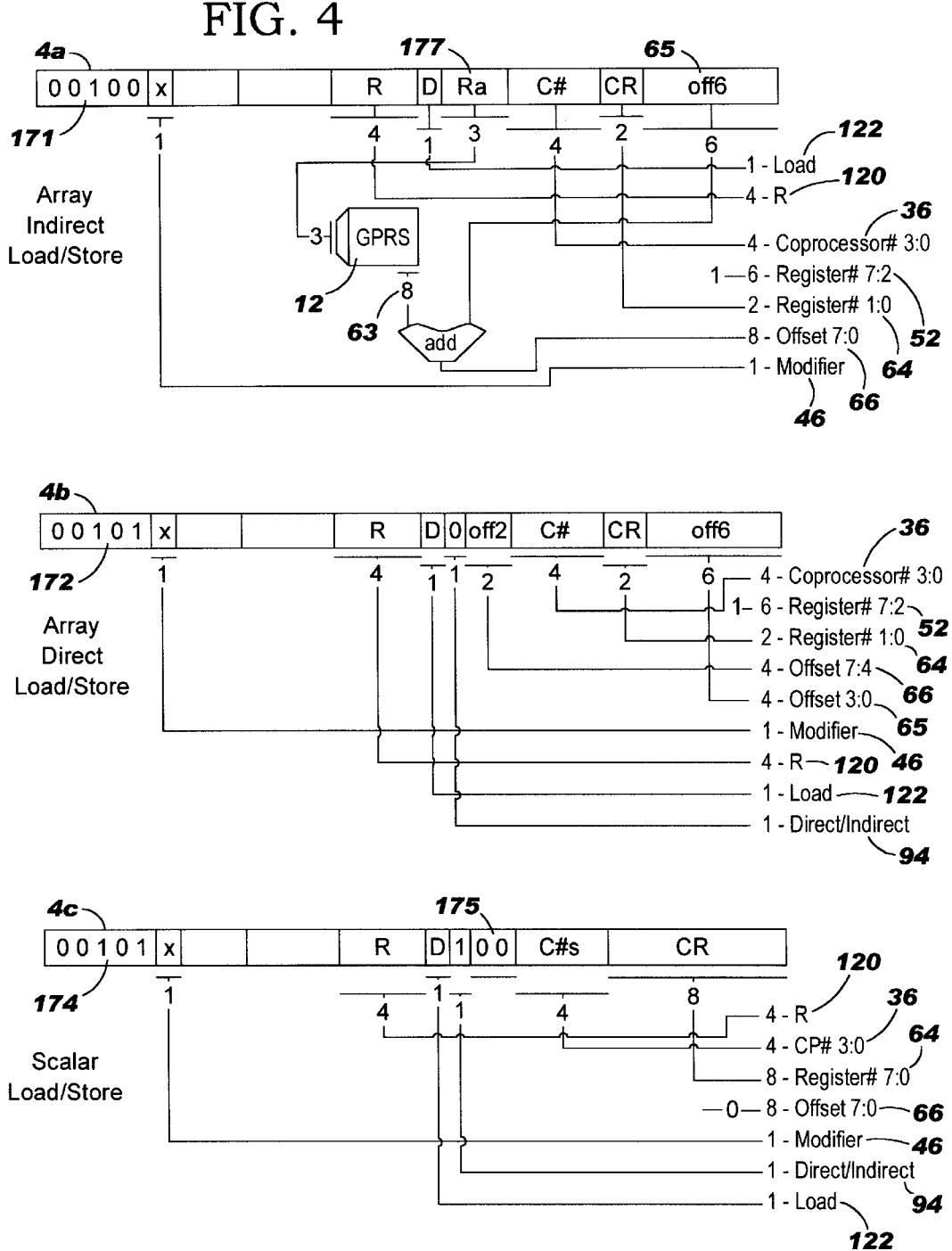
FIG. 4 is a diagrammatic representation of the central processor load/store instruction formats of the present invention.
Figure 5:
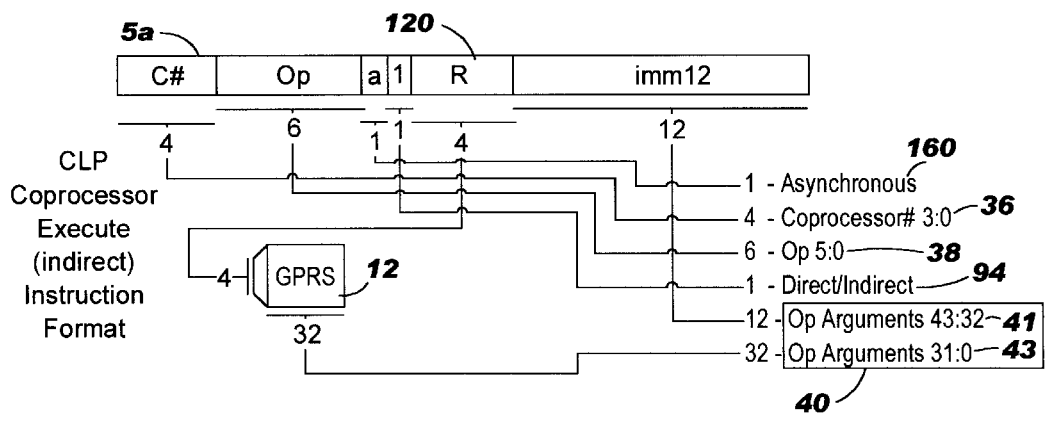
FIG. 5 is a diagrammatic representation of the central processor coprocessor execute instruction formats of the present invention.

Referring now to FIG. 10, the core execute instruction set of CLP 10 is shown in tabular form. The manner in which the CLP 10 obtains an instruction from an instruction memory (fetch) and interprets it (decode) is discussed in related application Ser. No. 09/548,109, filed Apr. 12, 2000, entitled "Coprocessor Structure and Method for a Communications System Network Processor," and is not the subject of this invention. For the purposes of this invention, the execution of the following instructions is important: indirect array register load/store 4a, direct array register load/store 4b, scalar register load/store 4c (all of which are also depicted in FIG. 4); and indirect coprocessor execute 5a and direct coprocessor execute 5b (which are also depicted in FIG. 5). These instructions will be discussed in greater detail later in this application.

Referring again to FIG. 2, the start field 34 is a one-bit field used to indicate to coprocessor 18a to start processing a command. When the CLP 10 encounters an execute instruction such as the indirect coprocessor execute instruction 5a of FIG. 10, the start field 34 tells coprocessor 18a that there is a command to be executed. Coprocessor 18a, designated by the CLP 10 to execute this command, is indicated by the coprocessor number identifier 36. This is a four-bit code, and accordingly sixteen different coprocessors 18 can be identified by this field.

Referring again to FIG. 2, the six-bit op field 38 tells the coprocessor 18a which command will execute. The op arguments 40 are data that are passed along with the commands for the coprocessor 18a to process. The busy signal 42 is a sixteen-bit field, one bit for each coprocessor, and indicates to the CLP 10 whether or not coprocessor 18a is finished with a command; this information is stored within the CLP 10 scalar register 14, depicted in FIG. 1. When the busy signal 42 goes to zero then the CLP 10 knows that coprocessor 18a is done with its command.

The OK/K.O. field 44 is a sixteen-bit field, one bit allocated per coprocessor 18. It is a one-bit return value code that is command specific. For example, it may be used to indicate to the CLP 10 whether a command given to coprocessor 18a ended with a failure, or whether a command was successful. This information is also stored within the CLP 10 scalar register 14, depicted in FIG. 1.

The modifier field 46 is a command-specific signal that may be interpreted by each individual command in its own fashion as defined by a hardware designer, and provides a way for the programmer to specify an additional bit of information to the hardware. What it does depends on how the coprocessor hardware designer chooses to interpret it. In the present network processor embodiment this bit is used to differentiate between two different kinds of load/store array register operations, depicted in FIG. 4, which will be described in detail later in this specification.

The write interface 30 uses the write field 48 to access coprocessor 18a. The write field 48 is forced to one whenever the CLP 10 wants to write data to coprocessor 18a. As discussed above, the coprocessor indicator field 36 indicates that CLP 10 will write to coprocessor 18a. The coprocessor register identifier 52 indicates the register that the CLP 10 will write to within coprocessor 18a. The coprocessor register identifier 52 is an eight-bit field and accordingly 256 registers are supported. The offset field 54 indicates the starting point for the data write operation in array 22a: this field is eight-bits in size and therefore will support 256 addresses within an array. The data out field 56 carries the data that will be written to the coprocessor 18a: it is thirty-two bits in size, and therefore up to thirty-two bits of information may be written in one time. The word field 60 determines whether sixteen bits or thirty-two bits of information is being written: when this value is zero then sixteen bits are being written; if this value is one, then thirty-two bits of information are being written. The write valid field 58 indicates to the CLP 10 when the coprocessor 18 is finished writing the data: this allows the CLP 10 to pause and hold the data valid while the coprocessor 18 takes the data.

The read interface 32 is similar in structure to the write interface 30. The read field 62 corresponds to the write field 48, and is used by the CLP 10 to indicate when a read operation is to be performed on coprocessor 18a. The coprocessor number identifier field 63, register number field 64, offset field 66, data-in field 68, and read valid field 70 are similar in structure to their corresponding field's in the write interface 30, described above.

Referring now to FIG. 3, the registers visible to a CLP 10 programmer are depicted. What is important are the coprocessor status register 72 and the coprocessor completion code register 74. The coprocessor status register 72 stores the information from the busy signal field 42 of FIG. 2. This register indicates to a programmer whether the coprocessor 18a is available, or if it is busy. The coprocessor completion code register 74 stores information from the OK/K.O. field 44 of FIG. 2. Therefore, if a programmer needs to know whether coprocessor 18a is busy or is available, the programmer can get this information from the coprocessor status register 72. Similarly, the coprocessor completion code register 74 provides information to a programmer as to the completion of the coprocessor 18a tasks.

Referring sill to FIG. 3, a block diagram of the general-purpose registers 12, scalar registers 14 and array registers 16 of FIG. 1 is provided. The scalar register 14 provides for the following sixteen-bit program registers: a counter register 76, a program status register 78, a link register 80, and a key length register 82. Two thirty-two bit registers are also provided: the time stamp register 84, and the random number generator register 86. A scalar register index 84 is also provided. The general-purpose registers 12 may be viewed by a programmer in two ways. A programmer may see a general purpose register 12 as a thirty-two bit register, as is indicated by the thirty-two-bit labels 86 shown in the FIG. 3 (w0 through w14). A programmer may also manipulate a general-purpose register 12 as a sixteen-bit register, according to the sixteen-bit labels 88 (r0 through r15). The array registers 16 are revealed to a programmer through the array register index labels 90.

Referring now to FIG. 5, two block diagram depictions of the CLP 10 coprocessor execute instruction formats of the present invention as shown, a coprocessor indirect execute format 5a and a coprocessor direct execute format 5b. The coprocessor number identifier field 36, the op field 38 and the op arguments field 40 of FIG. 2, and the CLP general purpose register 12 of FIG. 1 are also shown here. The numeric notations next to the alpha labels appearing in FIG. 4 and FIG. 5 correspond to nomenclature utilized in programming architecture. For example, the label "4—Coprocessor#3:0" for coprocessor number identifier 36 indicates that this is a four-bit field, with bit three as the highest order bit, and bit zero as the lowest order bit When a direct/indirect field 94 bit is forced to one, indirect coprocessor execute format 5a is enabled: thirty-two bits of data for the op argument 43 are obtained from a general purpose register 12 address 13 specified by the four-bit R field 120, and twelve bits of memory for op argument 41 come directly out of the imm field 96. This results in a total forty-four-bit op argument 40.

When the direct/indirect field 94 bit is forced to zero, the direct coprocessor execute format 5b is selected: sixteen bits of memory for op argument 47 are provided by the imm field 98, and the twenty-eight bits of op argument 45 are set to zero, resulting in a total forty-four bit op argument 40.

Figure 6:
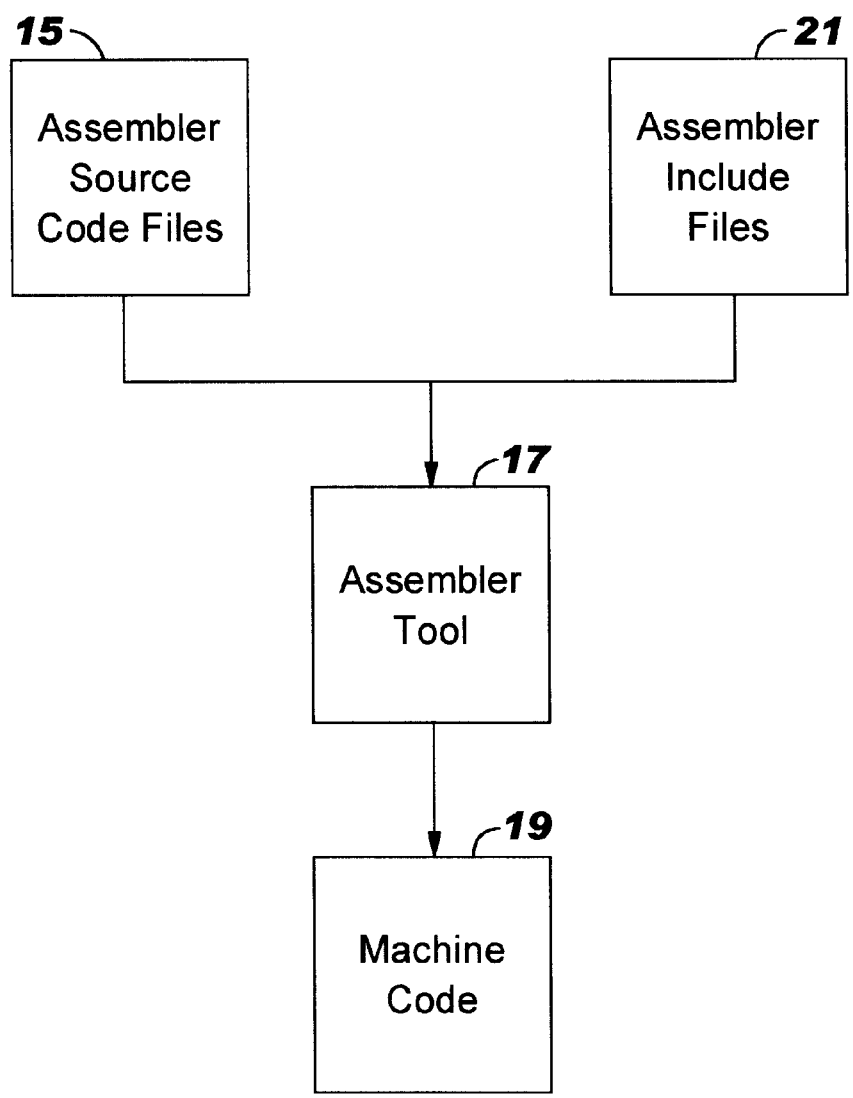
FIG. 6 is a block diagram of the software assembler tool of the present invention.
Figure 8:
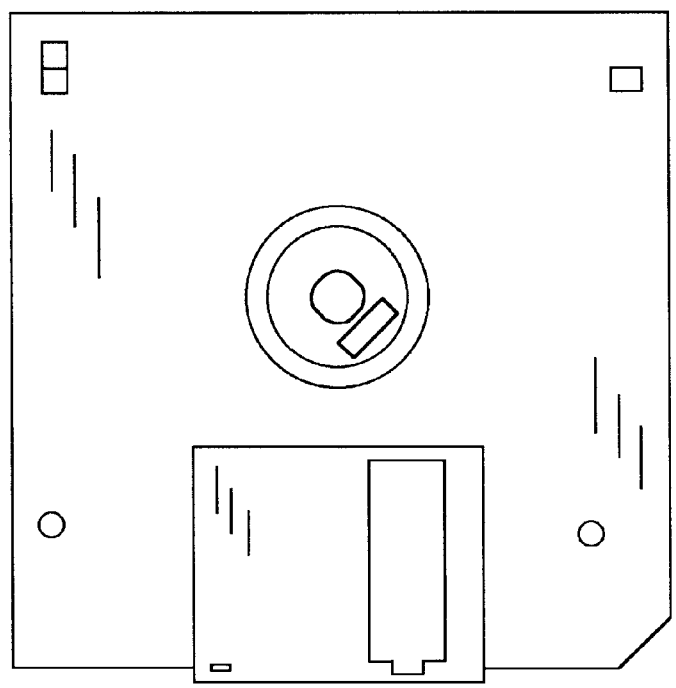
FIG. 8 is a graphic representation of a software embodiment of the assembler tool of the present invention residing on a magnetic storage disc.
Figure 9:
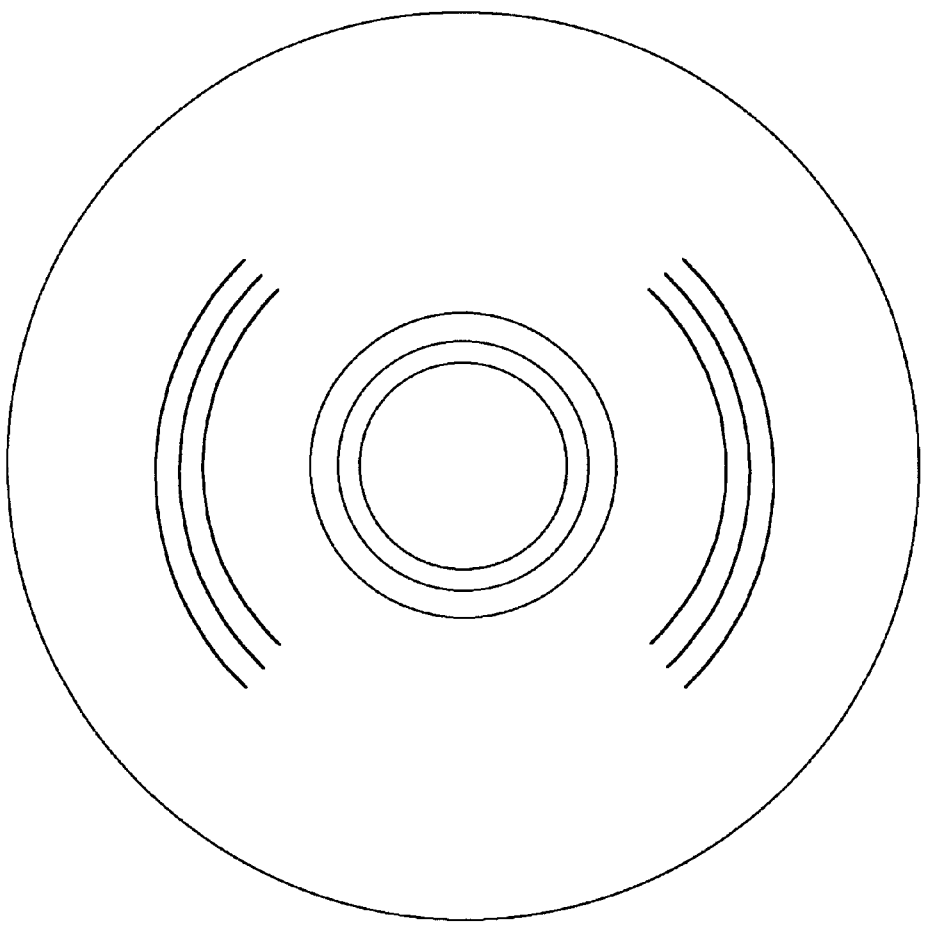
FIG. 9 is a graphic representation of a software embodiment of the assembler tool of the present invention residing on an EEPROM storage disc.

Referring now to FIG. 6, a block diagram illustrating the assembler tool 17 of present invention is provided. The assembler source code 15 is contained in one or more files. One or more assembler include files 21 are also provided. As is well known in the art, an assembler tool is a software language translator that uses a pneumonic form of machine language, a human-friendly machine code, to translate from assembly language into binary machine code. An assembler tool is "built" by taking a collection of source files written in a computer programming language, such as "C" or "C++", compiled and linked together to create a binary executable program. The assembler tool 17 takes assembler source code 15 and assembler include files 21 as input and produces machine code 19 output. In other words, the assembler tool 17 takes as its input something written in English and produces as its output something as written in binary machine code. What is new is the use of a "coprocessor directive" to tell the assembler tool 17 how to generate the commands that it needs to generate for a specific coprocessor; in other words, the coprocessor directive enables the assembler tool 17 to map English language commands into binary machine code specific to the coprocessor that the assembler tool 17 is programmed for. In the prior art Mappings for central processor instructions for the control of coprocessors are hard coded into an assembler tool at the time that the tool is compiled or "built"; they are part of the core instruction set, and they do not change. The only way to change these instructions if a coprocessor is changed is to replace information in the assembler source code and/or the assembler include files and recompile or "rebuild" the prior art assembler tool at the time of manufacture. But coprocessors are flexible, and are designed to change from one hardware version to another. What is needed is a way to change coprocessors without having to rebuild an assembler tool. This is accomplished in the present invention with the coprocessor directive 100 of FIG. 7: it tells the assembler tool 17 the mapping between the English input and the binary code output for each defined coprocessor 18.

A limitation of a prior art assembler tool (not shown) is that it must be programmed specifically for each processor it is intended to control: for example, if a particular coprocessor has 16 registers, then 16 registers are revealed in the assembler code, and the code must be compatible with a 16 register coprocessor. If a coprocessor is changed, or another is added, and the new coprocessor has either more or less than 16 registers, than the prior art tool must be "rebuilt" for the correct number of registers. Accordingly, a prior art assembler tool is not portable but is device specific. Somehow the assembler must reveal the existence of the coprocessors to the programmer. The assembler has to recognize the different commands for the different coprocessors.

The assembler tool 17 comprises a set of CLP 10 instructions within the microprocessor complex which manipulate coprocessor registers, and coprocessor execute instructions which initiate command processing on the coprocessor. The inventive concept of the present invention is in the way that the coprocessor 18 scalar registers 20, array registers 22 and commands are revealed to the CLP 10. The CLP executes core instructions: data manipulation, and data retrieval for specific tasks. Specific tasks are assigned to the coprocessors 18, reducing the demand on the CLP 10 itself. In the embodiment of FIG. 1, coprocessor 18a is assigned to perform datastore routines, coprocessor 18b check sum routines, and coprocessor 18c datasum routines.

Referring now to FIG. 7, tabular representations of assembly code software with explanatory comments embodying the invention are depicted. What is new is the coprocessor directive 100 of Table 3 of FIG. 7, which is contained either in the include files 21 or the source files 15 of FIG. 6, and which executes among the coprocessors 18 and initiates command processing by the CLP 10 on the coprocessors 18.

The coprocessor directive 100 describes to the assembler tool 17 the details of a specific coprocessor 18a in such a way that the assembler tool 17 does not have to be rebuilt if the coprocessor 18a is changed: it instructs the assembler tool 17 itself to recognize the new device.

FIG. 7, Table 1 depicts a code that passes assembly by the assembly tool 17 because all symbols contained are defined in the base CLP 10. In contrast, Table 2 of FIG. 7 depicts a code that fails assembly by the assembly tool 17 because symbols wrdnds 150, fishpool 152 and DSA 154 are not defined in the CLP 10, but are instead part of a coprocessor 18.

Referring now to Table 3 of FIG. 7, in view of FIG. 1, the code listed in this table assembles correctly because of the inclusion of coprocessor directive 100. Coprocessor directive 100 code line 102 tells the assembler tool 17 about the existence of a coprocessor 18a and identifies it with the unique symbolic name ds 158. By using a symbolic name instead of a number to identify the coprocessor 18a a programmer may more easily identify and manipulate the coprocessor within programming code. In contrast, if identified by a number the coprocessor 18a may be more easily mistaken for an instruction or parameter, or a programmer may more easily confuse the coprocessor 18a for another, such as coprocessor 18b.

Coprocessor directive 100 line 102 binds the value of one to the symbol ds 158: anytime coprocessor 18a is addressed as ds 158 the assembler tool 17 will generate a one for the purposes of identifying the coprocessor 18a. For example, the assembler tool 17 will force the coprocessor number identifier field 36 of FIG. 2 to a value of one.

Coprocessor directive 100 code line 104 tells the assembler tool 17 about the existence of a command for coprocessor 18a. Coprocessor directive 100 code line 106 assigns the unique symbolic name wrdnds 150 to the command defined by code line 104 and associates the value of zero with this command. Now every time the assembler tool 17 encounters the command wrdnds 150 in the assembly code, it will recognize that this command is not a CLP 10 command, but will know that this is a command for coprocessor 18a, and it will generate one of the two instruction formats 5a or 5b shown in FIG. 5. The op field 38 of FIG. 5 will accordingly be forced to value of zero. The op field 38 is 6 bits in size, and therefore may list up to 64 different commands for each coprocessor 18.

Coprocessor directive 100 code line 108 tells the assembler tool 17 about the existence of array register 22a within coprocessor 18a. Code line 110 defines the array register 22a as symbolic name fishpool 152 and assigns it the value of "254." The number "254" will be translated through by the assembler tool 17 and will show up in the instruction. Referring again to FIG. 2, number "254" will be placed into the coprocessor register identifier fields 52 and 64.

Coprocessor directive 100 code line 112 tells the assembler tool 17 about the existence of scalar register 20a within coprocessor 18a. Code line 114 tells the assembler tool 17 that scalar register 20a is called "DSA" 154 and is assigned the value of zero. The number "0" will be translated through by the assembler tool 17 and will show up in the CLP 10 instruction. Referring again to FIG. 2, zero will be placed into the coprocessor register identifier fields 52 and 64. And lastly, code line 116 marks the end of the coprocessor directive 100.

The CLP processor's 10 base programming model is thereby extended, enabling the CLP 10 to issue commands to the coprocessor 18a and to manipulate the coprocessor 18a scalar register 20a and array register 22a as if they were part of the CLP processor 10. The command wrdnds 150 defined within coprocessor directive 100 appear to the assembler tool 17 as additional assembly level mnemonics. When the assembler tool 17 encounters wrdnds 150, it generates one of the coprocessor execute instruction formats 5a or 5b shown in FIG. 5. The scalar and array registers defined within coprocessor directive 100 appear to the assembler tool 17 as additional scalar register DSA 154 and array register fishpool 152. When the assembler tool encounters one of these registers as an argument in a load or store instruction it generates one of the CLP 10 load/store instruction formats 41, 4b or 4c shown in FIG. 4.

The hardware designer provides the symbols wrdnds 150, fishpool 152, DSA 154, ds 158 and any other symbolic identifiers to a software programmer, giving the software programmer a list of scalar registers 20, array registers 22 and commands available and their associated numbers. What is important is that, as is readily apparent to one skilled in the art, the hardware designer is free to change the design of the coprocessor 18a without the need to "rebuild" the assembler tool 17. The present invention simplifies the maintenance of the assembler tool 17 through multiple hardware revisions by enabling programmer's to update their coprocessor definitions to reflect new or modified coprocessors. What is important is that the assembler tool itself does not have to be rebuilt to track hardware changes associated with the addition of new coprocessors or modifications of existing ones. In other words, the invention allows assembly time extension of a core language processing (CLP) programming model, without the need to rebuild the assembler tool itself.

A programmer utilizing the assembler tool 17 supplies text input which specifies specific instructions to be executed. A certain set of core instructions is built into the core. The core assembler recognizes those instructions and accordingly the correct syntax for those instructions and generates the machine code for those instructions. The invention also stabilizes the basic core language processor instruction set and documentation associated with it in that the core instruction set does not have to be changed to reflect changes in any coprocessor 18.

Referring again to FIG. 7, Table 3, code line 118 is an argument. Referring to FIG. 5, "#0" instructs the assembler tool 17 to pass all zeros as the argument for this command in the coprocessor execute direct instruction format shown in FIG. 5b. Accordingly all zeros will be placed in the imm field 98 of FIG. 5b. The wrdnds 154 component of code line 118 tells the assembler tool 17 that this is a coprocessor command, and accordingly the assembler tool 17 causes the number one to be written to the coprocessor number identifier field 36 of FIG. 5b. Since wrdnds 150 is defined as zero in code line 106, then a zero is written to the op field 38 of FIG. 5b.

Code line 118 may also indicate to the assembler tool 17 that it is indirect execute function, in the format illustrated in FIG. 5a. For example, by replacing the code line 118 argument "#0" with the argument "w0, #0", coprocessor directive 100 can tell the assembler tool 17 to select the indirect execute function. The argument "w0, #0" tells the assembler tool 17 to select the indirect instruction format because a register number has been indicated by the "w0" argument, and accordingly a zero will be written to the R field 120 of FIG 5a. The present embodiment of the invention can support up to 15 coprocessors 18, and accordingly the R field 120 may be instructed to write any value from 0 to 15.

Referring again to FIG. 5, the asynchronous field 160 is used to signal to the CLP 10 as to whether the coprocessor 18a has finished executing. If the asynchronous field 160 value is zero, than the CLP 10 will operate in synchronous mode and halt and wait for the coprocessor 18a to finish executing. If however the asynchronous field 160 value is one, than the CLP 10 will operate in asynchronous mode and keep going, and in essence the coprocessor 18a will execute the command in parallel.

Referring now to FIG. 4, the CLP 10 load/store instruction formats of the present invention are depicted, illustrating how the invention reads and writes to the scalar registers 20a and array register's 22a in the coprocessors 18a. Many of the fields and elements indicated on FIG. 4 are common to FIGS. 1–3 and 5, and accordingly the identification and numbering of these fields and elements are consistent, as a comparison of the Figures will readily reveal. The load field 122 determines whether information is written to or read from the coprocessor 18a: when this value is zero a "load" operation is performed which copies data from coprocessor 18a to a general purpose register 12 address 13 (as shown in FIG. 3). Conversely, when this value is one a "store" operation is executed and data is moved from a general purpose register 12 address 13 to coprocessor 18a. The R field 120 specifies which CLP 10 general purpose register 12 address 13 the load/store operation will use.

Referring to FIG. 4, if the code line 132 argument of FIG. 7 is modified, then the CLP 10 can be directed to address the coprocessor 18a in the indirect array load/store instruction 4a. An exemplary argument would be "r0+2." The "r0" component of the argument instructs the CLP 10 to get the low order eight bits of data 63 from CLP 10 general-purpose register 12 address 13 (shown in FIG. 3). The Ra field 177 of FIG. 4 contains a three-bit entry corresponding to the specific general purpose register 12 sixteen-bit address 88 (r0 through r15) chosen (shown in FIG. 3): since the "r0" argument specifies address 13, the Ra field will have a value of "000". The R field 120 is also used to specify specifies the address 13. The low order data 63 are added to six bits of data from the off6 field 65. The high order six bits of the eight-bit coprocessor register identifier field 52 are set to one. Op code field 171 contains bit values specific to and indicative of indirect array load/store instruction 4a: "0 0 1 0 0."

FIG. 4 also depicts scalar register load/store instruction format 4c. Referring again to Table 3 of FIG. 7, code lines 112 and 114 of the coprocessor directive 100 define the scalar register 20a as "DSA" to the assembler tool 17. Code line 130 instructs the CLP 10 to load from coprocessor "ds" 18a scalar register "DSA" 20a. The direct/indirect bit field 94 is set to one. Op code fields 174 and 175 contain bit values specific to and indicative of scalar register load/store instruction format 4c: "0 0 1 0 1" and "0 0", respectively. Offset field 66 has all eight bits set to zero.

FIG. 4 lastly depicts direct array load/store instruction format 4b. Referring again to Table 3 of FIG. 7, Code line 132 instructs the CLP 10 to load from coprocessor "ds" 18a array register "fishpool" 22a. The code line 132 argument "0" within the brackets indicates that the coprocessor 18a will be addressed in direct mode, and accordingly direct/indirect field 94 is set to zero. The high order six bits of the eight-bit coprocessor register identifier field 52 are set to one. Op code field 172 contains bit values specific to and indicative of direct array load/store instruction 4b: "0 0 1 0 1."

A further advantage is that the invention allows a hardware designer to test different "what if" scenarios when considering the addition of a new coprocessor or modifications of existing ones, through the use of software simulators to simulate the hardware. As is typical in the manufacture and sale of computer systems, the manufacturer keeps the source code for the assembler tool confidential which prevents the purchaser from rebuilding the assembler tool. What is new is providing the ability to a purchaser of the assembler tool to explore design opportunities which require modifying existing coprocessors or adding new coprocessors to the hardware design without having to require that the manufacturer rebuild the assembler tool in order to recognize these new or modified coprocessors. Thereby in-house or customer engineers may design new chips by adding coprocessors to this base chip structure. And as is readily apparent to one skilled in the art, one may propose changing or adding coprocessors by using a software simulator in combination with the present invention, a common practice known to those skilled in the art.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed is:

1. A computer system, comprising:
   a. a control processor;
   b. at least one coprocessor having registers;
   c. a coprocessor directive file comprising first software programming language arguments associated with the at least one coprocessor; and
   d. a compiled assembler tool configured to generate machine code instructions responsive to the coprocessor directive file, said machine code instructions enabling the control processor to manipulate the at least one coprocessor registers and initiate command processing upon the at least one coprocessor;
   e. wherein the coprocessor directive file may be reprogrammed with second software programming language arguments replacing the first arguments and the compiled assembler tool generate revised machine code instructions responsive to the second arguments, said revised machine code instructions enabling the control processor to manipulate the at least one coprocessor registers and initiate command processing upon the first coprocessor.

2. The computer system of claim 1, wherein said computer system further comprises:
   a. a core set of control processor software programming language instructions; and
   b. wherein the coprocessor directive file first arguments fiber comprise at least one executable software programming language coprocessor command;
   c. wherein the core set of control processor instructions is fixed at the time that the assembler tool is built;
   d. wherein the assembler tool is configured to generate the machine code instructions responsive to the core set of control processor instructions and the at least one coprocessor command, said machine code instructions enabling the control processor initiate command processing of the at least one executable command upon the at least one coprocessor; and
   e. wherein the at least one coprocessor command may be replaced with a second executable coprocessor command and the compiled assembler tool generate the revised machine code instructions responsive to the second command, said revised machine code instructions enabling the control processor to initiate command processing of the second command upon the at least one coprocessor.

3. The computer system of claim 1 wherein the control processor instruction set further comprises software programming language instructions which manipulate the coprocessor registers;

wherein the coprocessor directive file first arguments further comprises at least one first software programming language register identifier associated with each of the coprocessor registers;

wherein the assembler tool is configured to generate the machine code instructions responsive to the first register identifiers, said machine code instructions enabling the control processor to manipulate the registers associated with the first register identifiers; and wherein each of the first register identifiers may be replaced with a second software programming language register identifier and the compiled assembler tool generate the revised machine code instructions responsive to the second register identifier, said machine code instructions enabling the control processor to manipulate the registers associated with the second register identifiers.

4. The computer system of claim 1 wherein the at least one coprocessor is a plurality of coprocessors.

5. The computer system of claim 1, further comprising:

f. a second coprocessor;

g. wherein the coprocessor directive file is reprogrammed with additional third software programming language arguments and the compiled assembler tool generates revised machine code instructions responsive to the third arguments, said revised machine code instructions enabling the control processor to manipulate the second coprocessor registers and initiate command processing upon the second coprocessor.

6. The computer system of claim 1, wherein the at least one coprocessor is replaced with a third coprocessor having registers and the revised machine code instructions enable the control processor to manipulate the third coprocessor registers and initiate command processing upon the third coprocessor.

7. A method of controlling the programmability of a network processor, comprising the steps of:

a) providing a control processor;

b) providing at least one coprocessor having registers;

c) providing a coprocessor directive file comprising first software programming language arguments associated with the at least one coprocessor, d) compiling an assembler tool to generate machine code instructions responsive to the coprocessor directive file, said machine code instructions enabling the control processor to manipulate the at least one coprocessor registers and initiate command processing upon the at least one coprocessor, e) programming the coprocessor directive file with second software programming language arguments replacing the first arguments;

f) the compiled assembler tool generating revised machine code instructions responsive to the second arguments, said revised machine code instructions enabling the control processor to manipulate the first coprocessor registers and initiate command processing upon the at least one coprocessor.

8. The method of claim 7, comprising the additional steps of:

g) subsequent to the step d) of compiling the assembler tool adding a second coprocessor;

h) programming the coprocessor directive file with additional third software programming language arguments;

i) the compiled assembler tool generating revised machine code instructions responsive to the third arguments, said revised machine code instructions enabling the control processor to manipulate the second coprocessor registers and initiate command processing upon the second coprocessor.

9. The method of claim 7, comprising the additional step after the step d) of compiling the assembler tool of replacing at least one of the at least one coprocessors with a third coprocessor having registers; wherein the revised machine code instructions enable the control processor to manipulate the third coprocessor registers and initiate command processing upon the third coprocessor.

10. The method of claim 7 wherein the coprocessor directive file first arguments further comprise a first executable software programming language coprocessor command, further comprising the steps of:

j) the compiled assembler tool generating a machine code instruction responsive to the first coprocessor command, said machine code command enabling the control processor to initiate command processing of the first command upon the at least one coprocessor;

k) reprogramming the directive file by replacing the first one coprocessor command with a second executable software programming language coprocessor command; and l) the compiled assembler tool generating a revised machine code instruction responsive to the second command, said revised machine code instruction enabling the control processor to initiate command processing of the second command upon the at least one coprocessor.

11. The method of claim 7 wherein the coprocessor directive file first arguments further comprise at least one first software programming language register identifier associated with each of the coprocessor registers, further comprising the steps of:

m) the assembler tool generating machine code register instructions responsive to the first register identifiers, said machine code register instructions enabling the control processor to manipulate the registers associated with the first register identifiers;

n) reprogramming the directive file by replacing a first register identifier with a second register identifier; and o) the compiled assembler tool generating a revised machine code register instruction responsive to the second register identifier, said revised machine code register instruction enabling the control processor to manipulate the registers associated with the second register identifiers.

12. A compiled assembler tool comprising a coprocessor directive file comprising first software programming language arguments associated with a coprocessor and residing upon a machine readable media;

wherein the assembler tool generates machine code responsive to the coprocessor directive file for a control processor allowing the control processor to operate the coprocessor with said machine code; and wherein the coprocessor directive file may be reprogrammed with second software programming language arguments replacing the first arguments and the compiled assembler tool generate revised machine code instructions responsive to the second arguments, said revised machine code instructions enabling the control processor to manipulate the coprocessor registers and initiate command processing upon the coprocessor.

13. The machine readable media of claim 12 wherein the machine readable media is a magnetic disc.

14. The machine readable media of claim 12 wherein the machine readable media is an EEPROM.

* * * * *